(12) United States Patent
Fitter

(10) Patent No.: US 6,821,681 B2
(45) Date of Patent: Nov. 23, 2004

(54) ELECTROCHEMICAL CELLS AND AN INTERCHANGEABLE ELECTROLYTE THEREFORE

(76) Inventor: Johan C. Fitter, 51 Mount Street, Bryanston, Sandton, Gauteng Province (ZA)

( * ) Notice: Subject to any disclaimer, the term of this patent is extended or adjusted under 35 U.S.C. 154(b) by 375 days.

(21) Appl. No.: 09/927,805

(22) Filed: Aug. 10, 2001

(65) Prior Publication Data

US 2002/0038765 A1 Apr. 4, 2002

(30) Foreign Application Priority Data

Nov. 8, 2000 (ZA) .......................................... 2002/4112

(51) Int. Cl.⁷ ................................................ H01M 6/04
(52) U.S. Cl. ....................... 429/347; 429/188; 429/189; 429/204; 205/300; 205/302; 205/252; 205/253; 205/101; 252/62.2

(58) Field of Search ................................. 429/188, 189, 429/347, 204; 252/62.2; 205/300, 302, 252, 253, 101

(56) References Cited

U.S. PATENT DOCUMENTS

| | | |
|---|---|---|
| 3,660,170 A | 5/1972 | Rampel |
| 4,601,847 A | 7/1986 | Barber, Jr. |
| 4,673,470 A | 6/1987 | Obata et al. |
| 4,801,511 A | 1/1989 | Young |

*Primary Examiner*—Bruce F. Bell
(74) *Attorney, Agent, or Firm*—William J. Sapone; Coleman Sudol Sapone, P.C.

(57) ABSTRACT

An interchangeable electrolyte contains an additive that promotes interchangeable use between batteries and electroplating cells by limiting dendritic deposition in battery cells and promoting a smooth finish in an electroplating cell, such that fresh or spent electrolyte can be used interchangeably in these type of cells.

49 Claims, 1 Drawing Sheet

ELECTROCHEMICAL CELLS AND AN INTERCHANGEABLE ELECTROLYTE THEREFORE

TECHNICAL FIELD

This invention relates to electrochemical cells including secondary cells and electroplating cells, and to an electrolyte having an additive for use therein to support interchangeable use of the electrolyte between different electrochemical cells.

BACKGROUND

A disadvantage encountered in electrochemical cells used in electroplating processes concerns the unequal deposition of metal on the surfaces of the negative electrodes. Generally, a higher current density occurs at projections on the surfaces of the negative electrodes leading to a buildup of metal crystals in these areas. This disadvantage is conventionally addressed by the addition of small quantities of smootheners or brighteners to the electrolyte of the electroplating cell. These can include natural gums and resins or synthesized compounds and mixtures which have similar plating properties. Other additives are typically also used to promote the plating process.

In the case of secondary electrochemical cells such as lead acid battery cells, for example, deposition of metal ions on the negative electrodes generally lead to reduced performance and, in extreme cases, battery failure. However, in battery cells the use of property altering additives is discouraged as these are believed to detrimentally affect battery performance. One would not use an electrolyte formulated with additives for electroplating use in a lead acid battery.

Some additives have been proposed for use, for example in zinc-alkaline batteries. For example, a quaternary ammonium polymer has been proposed in U.S. Pat. No. 3,660,170 to Rampel, in respect of a rechargeable battery, and an electroplating cell to inhibit the formation of excessive dendritic zinc on the negative plates of these cells. However, there is no suggestion for preparation of an interchangeable electrolyte.

Some quaternary ammonium polymers were proposed in U.S. Pat. No. 3,877,993 to Davis, for use in dry cells to reduce the stand deterioration of the negative plates of these cells. A quaternary ammonium monomer was proposed in U.S. Pat. No. 3,928,066 to Lewenstein, for use in conventional lead-acid batteries to inhibit the evolution of hydrogen gas from the negative plates and thereby attenuate the loss of water from these batteries. Again, no suggestion on preparation of an interchangeable electrolyte is found, From the prior art, it appears that various electrolytes are known for use in electroplating and other electrolyte formulations are known for use in battery cells. While suggesting a modification of the characteristics prevailing at the surfaces of the negative electrodes of these electrochemical cells, none of these prior art measures appear to provide an electrolyte formulated with an additive which is suitable for use in preventing deposition of metal ions emanating from the positive electrode of the cell in a way suitable for both electroplating cells and battery cells, such that the electrolyte is interchangeable between these cells. While sharing some components, each electrolyte is typically tailored to the to specific end use. To date, there is no interchangeable electrolyte that can be used, for example, in a battery cell and subsequently in an electroplating cell. Presently, spent battery electrolyte is considered a waste product. Utilizing an interchangeable electrolyte could provide opportunities for re-use and promote economically justified recycling of battery electrolyte.

SUMMARY OF THE INVENTION

According to the invention there is provided an electrochemical cell comprising a positive electrode, an opposed negative electrode, an aqueous electrolyte in ionic contact with a negative electrode, and a deposition modifying agent for inhibiting electrodeposition on the negative electrode of metal ions emanating from the positive electrode thereby to reduce or inhibit mass gain of the negative electrode.

According to the invention, an interchangeable electrolyte has been provided which can be used in battery cells as well as electroplating cells. The interchangeability is achieved by incorporating a surface active deposition modifying additive that renders the electrolyte interchangeable, while further enhancing battery life during battery use, and promoting smooth plating in an electroplating cell.

In both uses, surface effects appear to be the key to interchangeability. In a battery cell, metal deposition has been shown to limit battery life, while in an electroplating cell, deposition is to be promoted, not avoided. Thus, it would normally be considered impossible to provide an electrolyte suitable for both uses. Surprisingly, the deposition modifying additives of the invention, while inhibiting dendritic growth in a battery cell electrolyte, also support smooth plating when the same electrolyte is used in an electroplating cell, such that spent battery acid could be re-used in an electroplating cell. While the mechanism is not completely understood, it appears that the additive in each case promotes more organized deposition, which in the case of a battery cell, limits dendritic growth, increasing battery life, and in the case of an electroplating cell, promotes a smooth even finish. Thus, an electrolyte containing the additive is interchangeable in use, both when fresh or when recycled.

According to the invention, an interchangeable electrolyte contains a deposition modifying agent which is preferably of a type which is ionic in nature and which is attracted to the surface of the negative electrode, thereby preventing or inhibiting deposition on the negative electrodes of metal ions originating from the positive electrode when attracted in normal operation to the negative electrode.

The deposition modifying agent may preferably include a polar aspect and a non-polar aspect so as to have an affinity for water as well as oils, fats and the like. Furthermore, the non-polar aspect preferably includes an alkyl substituent, which provides a barrier to ions originating from the positive electrode.

The electrochemical cell is preferably a secondary cell, such as a lead acid battery cell, for example, or an electroplating cell, such as a tin electroplating cell, for example. The electrochemical cell may also be a gel electrolyte battery cell.

The combination of electrolyte and deposition moderating agent provides an electrolyte which is interchangeable between the secondary cell and the electroplating cell on an equivalent volume basis or by concentration or dilution thereof until it reaches the required or optimum specific gravity for use in the secondary cell or electroplating cell, as the case may be.

In the case of a lead or tin electrode battery having a sulfuric acid electrolyte, n-alkyl dimethyl benzyl ammonium chloride and sodium dioctyl sulphosuccinate have been shown to be effective to inhibit deposition on these electrodes, to enhance battery life, yet the sulfuric acid electrolyte dosed with either one of these additives can as well, whether fresh or in a spent condition, be used interchangeably in, for example, a tin electroplating cell.

The invention extends to a method of providing an interchangeable electrolyte for use in electroplating and battery electrochemical cells comprising providing an electrolyte, adding to the electrolyte a deposition modifying agent, which is compatible with the components of the battery and electroplating electrochemical cells, being non-reactive or slowly reactive with the electrolyte and capable of being attracted to the negative electrode in order to inhibit or prevent dendritic deposition thereon of metal ions emanating from the positive electrode which are attracted to the negative electrode, and promoting smooth electroplating on the electroplating cell surface.

The invention also extends to an electrochemical cell having a deposition modifying agent deposited on a component of the cell operatively in contact with an electrolyte placed in the cell so that, when an electrolyte is added to the cell, the deposition inhibiting agent associates with the electrolyte so as to be attracted to the negative electrode in order to inhibit or prevent deposition thereon of metal ions emanating from the position electrode which are attracted to the negative electrode during operation of the cell, the electrolyte after use being interchangeable and/or recyclable for use in a different electrochemical cell.

DETAILED DESCRIPTION OF THE INVENTION

Figure 1:
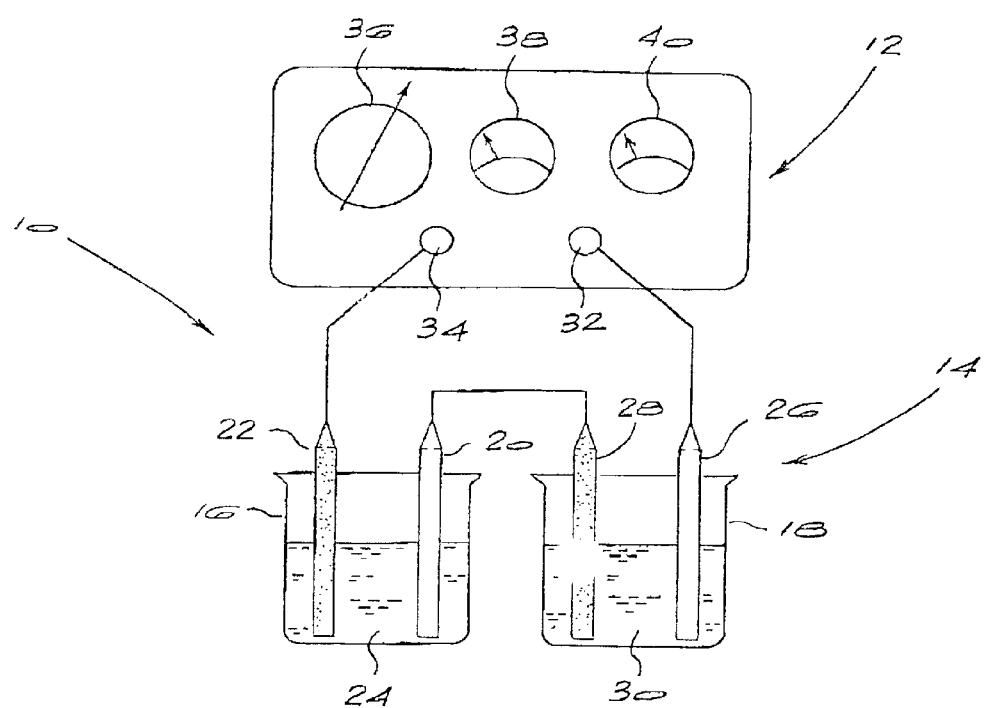
FIG. 1 is a schematic drawing showing a pair of electrochemical cells for evaluating the interchangeability effect of providing an electrolyte incorporating an additive of the invention therein.

The invention relates to the use of a deposition modifying agent or additive with an electrolyte of a type used in an electrochemical cell. The preferred group of chemical compounds suitable as additive is defined as any agent, solid or liquid, which when incorporated into an electrochemical cell electrolyte, promotes a reduction in the rate or type of deposition of metal on the negative electrodes of the cell, thereby providing an improvement in the quantity and quality of electrodeposition which is of benefit to the operation of the electrochemical cell, whether as a battery or as an electroplating cell.

The type of electrochemical cell suitable for use with an electrolyte and additive of the invention includes battery cells and electroplating cells, as well as other cell types including electrolytic and electrolysis cells.

In the care of battery cells and some electrolysis cells, the benefit accrues as an increase in the service life of the cells. In the case of electroplating cells and some electrolytic cells, the benefit manifests itself by providing a smoother plated-on surface. As to both, the interchangeability of the electrolyte allows reuse and/or recycle in a different application, substantially reducing the production of waste electrolyte. Spent electrolyte from a battery, for example, can be collected and used as a replenishment in an electroplating cell, or be blended with fresh electrolyte and used in a new battery. As the electrolyte has as substantially its only additive a material which promotes smooth plating or enhanced battery life, it retains its value even after its primary function has been achieved.

As described above, incorporation of the additive into the electrolyte provides the electrolyte with a facility of interchangeability. By way of example, a sulfuric acid electrolyte including an additive of the invention is suitable for a lead-acid battery cell as well as a tin electroplating cell, through which association it will provide the benefit which manifests itself in electroplating cells. In this regard, such a receiving electroplating cell need not usually be already associated with an additive or an electrolyte at the time of transference.

The additive preferably consists of an organic compound that is compatible with the materials of the electrochemical cell and does not react, or reacts only very slowly, with the electrolyte. The organic compound preferably has a polar aspect to its molecule as well as a non-polar aspect, and therefore has an affinity for water as well as oils, fats and the like. The compounds that are successful with a particular metal in combination with a particular electrolyte are not necessarily successful with other metal-electrolyte combinations, and selection is therefore mainly empirical. However, as a guideline, organic compounds having at least 8 carbon atoms may be used, more preferably having from about 8 to 28 carbon atoms, and most preferably having about 16 to 28 carbon atoms. As another guideline, those organic compounds having a molecular weight of from about 250 to 550, more preferably 350 to 450, and most preferably about 400 to 410 may be used. Quaternary ammonium compounds are preferred.

The organic compounds that have proved useful with tin and lead electrodes in a sulfuric acid electrolyte include n-alkyl dimethyl benzyl ammonium chloride and sodium dioctyl sulphosuccinate. Significantly the former is cationic and the latter is anionic in solution.

Other compounds that have proved useful to a lesser extent include n-alkyl dimethyl benzyl ammonium sulphate, didecyl dimethyl ammonium chloride, didecyl methyl oxyethyl ammonium propionate, as well as a wide range of other quaternary ammonium compounds including pyridine and quinoline. Certain amines, amine salts and amides have also proved useful. The n-alkyl dimethyl benzyl ammonium chloride is water based while the sodium dioctyl sulphosuccinate is methanol based.

The structure of the n-alkyl dimethyl benzyl ammonium chloride molecule is approximated by the formula:

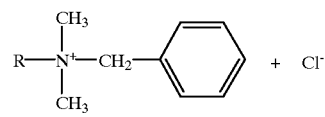

with R corresponding to an n-alkyl substituent which is a mixture of $C_{12}$, $C_{14}$ and $C_{16}$.

The structure of the sodium dioctyl sulphosuccinate is approximated by the formula:

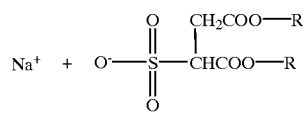

with R corresponding to a $C_8$ alkyl substituent

Although the particular mechanism of how the agent interacts with the negative electrode of the electrochemical cell is not fully understood, the following is provided as a possible explanation of its effective use in providing an interchangeable electrolyte.

The charged portion of the molecule as well as the alkyl chains are believed to play important parts in the process which restricts the rate and type of deposition of metal on the negative electrode of the electrochemical cell.

Alkyl substituent are generally "straight-chain" hydrocarbons, which consist of an undulating chain of carbon atoms, which in the case of $C_8$ is represented as follows:

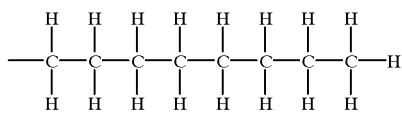

They may be found fully extended, rolled up into a ball or in an intermediate shape. Adjacent molecules typically arrange themselves in a solution in an appropriate shape to maximize the distance between the alkyl hydrogen atoms. Although alkyl substituents are strongly water repelling, within certain molecules they are able to dissolve in water due to the molecules' charged "heads" having an affinity for polar molecules, such as water.

In the case of agents comprising molecules that are ionized, they are expected to be attracted to the surface of the negative electrode by electrostatic attraction in a manner that is similar to the way metal ions are attracted. The degree of attraction is dependent on the electrochemical potential of the substance in question.

It seems reasonable to expect that the charge on the n-alkyl dimethyl benzyl ammonium ion attracts it directly onto the surface of the negative electrode. It is possible that the dioctyl suiphosuccinate ion couples to an intermediary ion present in the electrolyte and the combination is attracted onto the surface of the negative electrode.

Once attached, these agents appear to present a web or a tangle of alkyl chains which appear to be comparatively impervious to the metal ions originating from the positive electrode, and which are attracted to the negative electrode, at least to the extent that they preclude dendritic growth.

It further appears from tests carried out that the n-alkyl dimethyl benzyl ammonium ion is attracted to the extremities of metal crystals that are growing on the surface of the negative electrode and the dioctyl sulphosuccinate ion is attracted closer to the surface of the electrode.

This appears to be borne out by the appearance of the electrode surface after extended operation, in which microscopic examination reveals the crystalline deposition in the case of the n-alkyl dimethyl benzyl ammonium to be significantly blunted in appearance while the dioctyl sulphosuccinate appears to be more stringy.

Despite the difference in appearance, and a risk of the dioctyl sulphosuccinate material becoming dislodged, the deposited material can be weighted, showing that the rate of deposition is, in both cases, very similar.

Referring to FIG. 1, an apparatus required to demonstrate the practice of the invention comprises an electrochemical unit 10 which include a power source 12 and a set of electrochemical cells 14.

The Set of electrochemical cells 12 comprises a first cell 16 and second cell 18. The first cell 16 includes a positive electrode 20, a negative electrode 22 and an electrolyte 24. The positive electrode 20 and the negative electrode 22 are immersed in, or otherwise conveniently brought into contact with, the electrolyte 24. The second cell 18 includes a positive electrode 26, a negative electrode 28 and an electrolyte 30. The positive electrode 26 and the negative electrode 28 are immersed in, or otherwise conveniently brought into contact with, the electrolyte 30. The power source 12 includes a positive output terminal 32 and a negative output terminal 34. The power source 12 provides an electric current of controlled magnitude to the first cell 16 and the second cell 18, which are connected in series, with the positive terminal 32 connected to the positive electrode 26, the negative electrode 28 connected to the positive electrode 20 and the negative electrode 22 connected to the negative terminal 34. This arrangement ensures that the current flowing through the first cell 16 is matched as closely as is feasible by the current flowing through the second cell 18.

This further ensures that the electrolytic reactions that occur within the first cell 16 and within the second cell 18 may be predicted to be closely matched in accordance with Faraday's laws.

Functionally, an electrochemical cell of the invention, which is not shown, will correspond to the cell 16 and comprises at least one positive electrode corresponding to the electrode 20, at least one negative electrode corresponding to the electrode 22, and an electrolyte which is of the same composition as the electrolyte 24. Typically, the first cell 16 is not provided with an electrolyte at first. Typically, a portion of the electrolyte drawn from the cell for the invention is transferred into the first cell 16, thereby providing the first cell 16 with a requisite quantity of electrolyte for its proper function.

Similarly, the negative electrode of the cell of the invention and the corresponding negative electrode 22 need not be constructed of and need not contain the same elements or metals, nor contain any elements or metals they may have in common in an equal proportion.

Subsequent to transference of a suitable quantity of the electrolyte drawn from the cell of the apparatus of the invention to the first cell 16, and thereby providing the cell 16 with the requisite electrolyte 24, the second cell 18 is provided with a suitable quantity of an electrolyte 30, which quantity is procured from a source substantially free of any known agent as herein described.

The positive electrodes 20 and 26 typically contain in excess of 90 percent by weight of tin, while the negative electrodes 22 and 28 typically have a 60:40 to 50:50 tin-lead solder composition. The electrodes wire may be conventionally coiled prior to incorporation into the cells 16 and 18, having a typical coil diameter of 10 millimeters and a spacing between the positive electrode 26 and the negative electrode 28 of at least 30 millimeters. The electrodes 20 and 22 are arranged to match the disposition of the corresponding electrodes 26 and 28.

The electrochemical cells 16 and 18 are each rated to conventionally contain an approximate volume of 100 milliliters of electrolyte. The cells 16 and 18 and their components may be scaled up or down dimensionally, as well as up numerically.

The power source 12 is activated to commence electroplating operation. The current in the circuit is controlled by a regulator represented by a rotatable controller 36. The current in the electrochemical cell circuit is indicated by an ammeter 38 and the voltage across the electrochemical cells 16 and 18 is indicated by a voltmeter 40. The power source regulates the current in the circuit at 150 milliamperes and the voltage self-adjusts according to cell requirement, but does not exceed 3.5 V/cell. The current is regulated to an accuracy of plus-minus 10 percent.

The use of the above apparatus in determining the efficacy of the invention is set out in the following examples.

EXAMPLE 1

A comparison of five samples of electrolyte simulating five samples drawn from various sources was performed.

The electrochemical cells 16 and 18 were electrically connected in series and therefore an additional three cells corresponding to the cell 16 and having electrodes corresponding to the electrodes 20 and 22 were connected in series with the cells 16 and 18. While the power source 12 was obliged to supply a voltage totaling 2½ times the voltage requirement of two cells, the current in the circuit was unchanged.

All five positive electrodes were constructed of 2 millimeter diameter 97:3 tin-silver solder wire and weighed 10.00 g each. All five negative electrodes were constructed of 3.2 millimeter diameter 50:50 tin-lead solder wire and weighed 10.00 g each.

The electrochemical cells were numbered consecutively, with number 1 being allocated to the cell 18, number 2 allocated to the cell 16, and numbers 3, 4, and 5 being allocated to the additional three cells in the circuit.

Measured samples of 100 milliliters of electrolyte were procured from the same container of 1.250 specific-gravity battery-grade sulfuric acid. Each of the five samples received 1.5 milliliters of water containing various additive agents, with exception of electrolyte 1, which received only water. The 1.5 milliliters of additive raised the volume of electrolyte of all five cells to 101.5 milliliters and reduced the specific gravity marginally but equally.

Subsequent to addition, cell 1 contained plain sulfuric acid in water. Cell 2 contained the same quantity of acid in water plus 300 parts per million (ppm), n-alkyl dimethyl benzyl ammonium chloride. Cell 3 included 300 ppm n-alkyl dimethyl benzyl ammonium sulphate. Cell 4 included 300 ppm didecyl dimethyl ammonium chloride. Cell 5 included 300 ppm sodium dioctyl sulphosuccinate.

The negative electrodes were weighed after 36 hours of electrochemical activity:

| | |
|---|---|
| ALL ELECTRODES PRIOR TO TEST | 10.0 g |
| NEGATIVE ELECTRODE 1 | 10.99 g |
| NEGATIVE ELECTRODE 2 | 10.74 g |
| NEGATIVE ELECTRODE 3 | 10.81 g |
| NEGATIVE ELECTRODE 4 | 10.95 g |
| NEGATIVE ELECTRODE 5 | 10.74 g |

From the forgoing, it can be seen that the plain-electrolyte electrode gained 0.99 g while the electrodes exposed to additives of the invention gained less weight. The n-alkyl dimethyl benzyl ammonium chloride and the sodium dioctyl sulphosuccinate appear to possess equal efficacy having provided the least weight gain in equal proportion, at roughly 25 percent down.

Since there was some evolution of gas at both the positive and the negative electrodes, it seems reasonable to infer that the differences in the measured weights of the electrodes can be attributed to the chemical equivalent of at least a portion of hydrogen gas emanating from the negative electrodes during the process.

The surface of electrode 1 received a poor quality fluffy covering, electrodes 4 and 5 received a more compact covering and electrodes 2 and 3 received an electroplate finish having potential mirror-quality finish with system adjustment.

EXAMPLE 2

A comparison of three samples of electrolyte simulating three samples drawn from various sources was conducted. The third cell was accommodated in the test similarly to the way the three extra cells were accommodated for Example 1, with the power source 12 being obliged to supply 1½ times the voltage requirement of two cells.

All three positive electrodes were constructed out of segments taken out of the positive plates of a motive power lead-acid battery cell. The grid construction contained about 6 percent of antimony in lead. The paste consisted of lead-dioxide. Although it is difficult to match the weights of pasted plate segments upon disassembly of positive battery plates, it was possible to weigh out three plates having a weight of about 15 g each, plus/minus 0.5 g.

The rate of electrodeposition of lead on a negative electrode in a sulfuric acid electrolyte is extremely slow. A first test was conducted using negative electrodes identical to those employed in Example 1, but there was no discernible weight gain in any of the negatives after 150 hours.

It is common for lead-acid submarine batteries to be provided with negative electrodes having a grid structure based on copper. This assists in maximizing battery performance during a heavy discharge, as required for attaining maximum speed for the submarine. Copper is suitable for his application since its electrochemical potential, at $Cu^{++}+2e^-=+0.34$ volts, which makes it "nobler" than lead at $Pb^{++}+2e^-=-0.13$ volts. A plain copper negative can be introduced into a lead-acid battery cell without discernable deleterious effect provided that a charging current is maintained. A lead film is deposited on the surface of the copper electrode which assists in establishing the potentials pertaining to a conventional lead-acid battery cell.

In the light of the above, negative electrodes were consequently constructed out of a copper foil which possessed a bright reflective surface, and the cells were fully assembled, connected and the power source was energized, before the three samples of electrolyte were poured into all three cells virtually simultaneously.

The electrolyte of cell 6 was provided with ingredients equivalent to the electrolyte of cell 1 in Example 1. The electrolyte of cell 7 was provided with ingredients equivalent to the electrolyte of cell 2 in Example 1. The electrolyte in cell 8 was provided with ingredients so equivalent to the electrolyte of cell 5 in Example 1.

The construction of the cells facilitated visual observation of the negative plates undergoing test, and after several hours a visible dulling of the plate surfaces became apparent. This dulling was made easily visible by the reddish coloration and the brightness of the surfaces of the negative electrode plates contrasting sharply against the pronounced greying and dulling produced by the on-plating lead, and antimony, which originated form the positive plates.

After 24 hours the appearance of all the negative plate electrodes had undergone significant change, with electrode 6 appearing quite dark, verging on black with only a slight coppery tint showing; electrode 7 appearing relative coppery with a slight grayish tinge; and electrode 8 appearing somewhat darker than electrode 7, but very much more coppery than electrode 6.

From these appearances, it could be deduced relatively easily that the rate of electrodeposition on electrode 6 had been significantly higher than on electrodes 7 and 8, and that the rate of electrodeposition on electrode 8 had been marginally higher than on electrode 7.

EXAMPLE 3

Two identical 6 volt type 105 deep cycling lead-acid batteries were subjected to the Battery Council International Deep Cycling Battery Test Procedure (5/93). The tests were carried out at room temperature and spanned a time of approximately seven months. A charging current was applied at 30 amperes, to a voltage limit of 2.55 V/cell, and until 130 percent of the previously discharged capacity was returned. Discharge was applied at 75 amperes, down to a voltage limit of 1.75 V/cell. The batteries were rested for 4 hours before commencing the next cycle.

Battery 1 contained stock standard electrolyte and was replenished every two weeks with plain battery water. Battery 2 contained stock standard electrolyte to which had been added a dosage of n-alkyl dimethyl benzyl ammonium chloride to provide a concentration in the electrolyte of 200 parts per million. Battery 2 was replenished every two weeks with plain battery water to which had been added a dosage of n-alkyl dimethyl benzyl ammonium chloride to provide a concentration in the water of 800 parts per million.

The testing procedure applied to battery 1 and battery 2 was commenced and terminated simultaneously, and the batteries located in close proximity to ensure equalization of any temperature variations. Battery 1 failed after competing 414 cycles and battery 2 had completed 422 cycles at this point. Both batteries were taken out of the test and were disassembled.

A corresponding cell on each matter was selected, and the elements therein carefully disassembled. Six negative plates from one cell of battery 1 and six negative plates from the corresponding cell of battery 2 were weighed including their associated separators to ensure that any plated-on material would be included in the measurement.

| BATTERY 1 (plain) | BATTERY 2 (additive) |
| --- | --- |
| 374.4 g | 375.0 g |
| 403.8 g | 374.5 g |
| 396.8 g | 373.4 g |
| 401.2 g | 379.6 g |
| 400.0 g | 372.4 g |
| 389.4 g | 371.8 g |
| 394.3 g (average) | 374.5 g (average) |

The above batteries were undoubtedly manufactured to exacting standards and their respective plate assemblies can therefore be considered to have almost identical weights at the commencement of the testing procedure. As such the negative plates of the non-treated battery number 1 experienced a plated-on weight gain of about five percent over the negatives of the treated battery number 2.

EXAMPLE 4

A negative electrode identical to the negative electrodes employed in Example 1 was coated with a layer of 50 percent concentration n-alkyl dimethyl benzyl ammonium chloride to an extent approximately equivalent to the portion of the electrode which is submerged in the electrolyte while in use. This equated to about 36 millimeters of length.

The coating procedure included hanging the electrode vertically from a scale and allowing the coating liquid to drip off the electrode subsequent to an excess quantity having been applied. When the electrode weight reached 10.03 g. The electrode was briefly inverted, to allow the coating to establish itself on the surface without further dripping. Thereafter the electrode was baked in an oven at 120° C., (248° C.), for two hours.

After this, the electrode was placed in a vessel containing 100 milliliters of water, and the vessel was sealed, and agitated to remove as much as possible of the coating and to dissolve it in the water. Thereafter the concentration of n-alkyl dimethyl benzyl ammonium chloride in the 100 milliliter volume of water was ascertained by a spectrophotometer means. A concentration of 160 parts per million was revealed, which corresponds favorably with a theoretical concentration of a 50 percent solution weighing 0.03 g, at 0.98 SG in 100 milliliters of water, equivalent to 153 parts per million.

There is obviously no weight gain, the difference being due to measurement inaccuracies. However, the procedure does show the feasibility of applying a measured dosage of the additive to any part of an electrochemical cell known to be immersed in the electrolyte in normal use, but to facilitate a suitable delay before application of the electrolyte, when it is more convenient. Thus, an electrochemical cell can be kept in readiness for such application, a simple addition of electrolyte being the only requisite action to activate the electrolyte-additive combination.

EXAMPLE 5

A suitable quantity of electrolyte known to contain a requisite concentration of n-alkyl dimethyl benzyl ammonium chloride, and having a specific gravity of 1.120 was concentrated by simple boiling, until the specific gravity was estimated to have attained a value slightly in excess of 1,250. Thereafter, upon cooling, water was added until the specific gravity equated to 1.250. A 100 milliliter volume of this adjusted electrolyte was employed in a cell and tested in accordance with the procedure outline in Example 1. The electrolyte provided substantially identical performance to that of cell number 2.

This simple test demonstrates that an electrolyte can be transferred from, by way of example, a discharged lead-acid battery, to a tin electroplating cell using a simple boiling means to provide concentration to a requisite level. Only water is removed from the electrolyte. The converse is equally valid, and water may be added to adjust the electrolyte as required.

While preferred embodiments of the present invention have been shown and described, it will be understood by those skilled in the art that various modification or changes can be made without varying from the scope of the invention.

What is claimed is:

1. An interchangeable electrolyte for use in a battery cell and an electroplating cell, each cell having a positive electrode and a negative electrode contactable with the interchangeable electrolyte, the interchangeable electrolyte comprising an aqueous electrolyte and a surface deposition modifying additive in an amount adapted to promote interchangeable use in the battery cell and the electroplating cell.

2. The interchangeable electrolyte of claim 1 wherein the deposition modifying additive limits dendritic electrodeposition on the negative electrode of the battery cell.

3. The interchangeable electrolyte of claim 1 wherein the deposition modifying additive promotes smooth plating in the electroplating cell.

4. The interchangeable electrolyte of claim 1 wherein the aqueous electrolyte is composed of sulfuric acid and water.

5. The interchangeable electrolyte of claim 1 wherein the interchangeable electrolyte is diluted or concentrated prior to an interchangeable use thereof.

6. The interchangeable electrolyte of claim 1 wherein the deposition modifying additive is an organic compound having a molecular structure having both a polar aspect and a non polar aspect.

7. The interchangeable electrolyte of claim 1 wherein the deposition modifying additive is a surface active substance or a surfactant.

8. An electrochemical cell comprising a positive electrode, an opposed negative electrode, an aqueous interchangeable electrolyte suitable for use in a battery cell and an electroplating cell, the aqueous interchangeable electrolyte in ionic contact with the negative electrode, the interchangeable electrolyte engendered with a deposition modifying agent for inhibiting dendritic electrodeposition on the negative electrode of metal ions emanating from the positive electrode to reduce or inhibit mass gain of the negative electrode, wherein the deposition inhibiting agent is ionic in nature and attracted to the negative electrode or to an ionic species in the electrolyte, which together are attracted to the negative electrode.

9. An electrochemical cell according to claim 8, wherein the electrochemical cell is a secondary cell or an electroplating cell and wherein the deposition modifying agent and electrolyte are interchangeable between the secondary cell and the electroplating cell on an equivalent volume basis or by concentration or dilution thereof to the appropriate specific gravity of each cell.

10. An electrochemical cell according to claim 9, wherein the secondary cell is a lead acid battery cell and the electroplating cell is a tin electroplating cell.

11. An electrochemical cell according to claim 10, wherein the electrolyte is dilute sulfuric acid dosed with n-alkyl dimethyl benzyl ammonium chloride or sodium dioctyl sulphosuccinate as the deposition modifying agent.

12. A method of providing an interchangeable electrolyte for use in electroplating and battery electrochemical cells comprising providing an electrolyte, adding to the electrolyte a deposition modifying agent to form an interchangeable electrolyte which is compatible with the components of the electroplating and battery electrochemical cells, being non-reactive or slowly reactive with the electrolyte and capable of being attracted to the negative electrode, providing at least one effect selected from the group consisting of inhibiting or preventing dendritic deposition of metal ions emanating from the positive electrode on the negative electrode in a battery electrochemical cell and promoting smooth electroplating of an electroplating surface in an electroplating electrochemical cell and, removing the interchangeable electrolyte from a first electrochemical cell, adjusting the specific gravity of the interchangeable electrolyte from the first electrochemical cell, and adding the interchangeable electrolyte to a second electrochemical cell.

13. The method of claim 12, further comprising transferring the interchangeable electrolyte from a battery electrochemical cell to an electroplating electrochemical cell.

14. The method for claim 12, further comprising removing the interchangeable electrolyte from e a battery electrochemical cell, adjusting the specific gravity of the interchangeable electrolyte by dilution or concentration, and adding the interchangeable electrolyte to an electroplating electrochemical cell.

15. The method of claim 12, further comprising removing the interchangeable electrolyte from the battery first electrochemical cell, and blending the interchangeable electrolyte with a fresh electrolyte to form a recycled interchangeable electrolyte.

16. An interchangeable electrolyte for use in a battery cell and an electroplating cell, each cell having a positive electrode and a negative electrode contactable with the interchangeable electrolyte, the interchangeable electrolyte comprising an aqueous electrolyte and a surface deposition modifying additive in an amount adapted to promote interchangeable use in the battery cell and the electroplating cell wherein the deposition modifying additive is an organic compound having at least 8 carbon atoms.

17. The interchangeable electrolyte of claim 16 wherein the deposition modifying additive limits dendritic electrodeposition on the negative electrode of the battery cell.

18. The interchangeable electrolyte of claim 16 wherein the deposition modifying additive promotes smooth plating in the electroplating cell.

19. The interchangeable electrolyte of claim 16 wherein the aqueous electrolyte is composed of sulfuric acid and water.

20. The interchangeable electrolyte of claim 16 wherein the deposition modifying additive is an organic compound having a molecular structure having both a polar aspect and a non polar aspect.

21. The interchangeable electrolyte of claim 16 wherein the deposition modifying additive is a surface active substance or a surfactant.

22. The interchangeable electrolyte of claim 16 wherein the deposition modifying additive is an organic compound having from 8 to 28 carbon atoms.

23. The interchangeable electrolyte of claim 16 wherein the deposition modifying additive is an organic compound having from 16 to 28 carbon atoms.

24. An interchangeable electrolyte for use in a battery cell and an electroplating cell, each cell having a positive electrode and a negative electrode contactable with the interchangeable electrolyte, the interchangeable electrolyte comprising an aqueous electrolyte and a surface deposition modifying additive in an amount adapted to promote interchangeable use in the battery cell and the electroplating cell wherein the deposition modifying additive is an organic compound having a molecular weight of from 250 to 550.

25. The interchangeable electrolyte of claim 24 wherein the deposition modifying additive limits dendritic electrodeposition on the negative electrode of the battery cell.

26. The interchangeable electrolyte of claim 24 wherein the deposition modifying additive promotes smooth plating in the electroplating cell.

27. The interchangeable electrolyte of claim 24 wherein the aqueous electrolyte is composed of sulfuric acid and water.

28. The interchangeable electrolyte of claim 24 wherein the deposition modifying additive is an organic compound having a molecular structure having both a polar aspect and a non polar aspect.

29. The interchangeable electrolyte of claim 24 wherein the deposition modifying additive is a surface active substance or a surfactant.

30. The interchangeable electrolyte of claim 24 wherein the deposition modifying additive is an organic compound having from 8 to 28 carbon atoms.

31. The interchangeable electrolyte of claim 24 wherein the deposition modifying additive is an organic compound having from 16 to 28 carbon atoms.

32. An electrochemical cell comprising a positive electrode, an opposed negative electrode, an aqueous interchangeable electrolyte suitable for use in a battery cell and an electroplating cell, the aqueous interchangeable electrolyte in ionic contact with the negative electrode, the interchangeable electrolyte engendered with a deposition modifying agent for inhibiting dendritic electrodeposition on the negative electrode of metal ions emanating from the positive electrode to reduce or inhibit mass gain of the negative electrode, the deposition modifying agent including an alkyl substituent that is non-polar in nature and provides a barrier to metal ions originating from the positive electrode.

33. An electrochemical cell comprising a positive electrode, an opposed negative electrode, an aqueous interchangeable electrolyte suitable for use in a battery cell and an electroplating cell, the aqueous interchangeable electrolyte in ionic contact with the negative electrode, the interchangeable electrolyte engendered with a deposition modifying agent for inhibiting dendritic electrodeposition on the negative electrode of metal ions emanating from the positive electrode to reduce or inhibit mass gain of the negative electrode, wherein the electrochemical cell is a secondary cell or an electroplating cell and wherein the deposition modifying agent and electrolyte are interchangeable between the secondary cell and the electroplating cell on an equivalent volume basis or by concentration or dilution thereof to the appropriate specific gravity of each cell, the secondary cell being a lead acid battery cell and the electroplating cell being a tin electroplating cell, the electrolyte being dilute sulfuric acid dosed with n-alkyl dimethyl benzyl ammonium chloride or sodium dioctyl sulphosuccinate as the deposition modifying agent.

34. A method of providing an interchangeable electrolyte for use in electroplating and battery electrochemical cells comprising providing an electrolyte, adding to the electrolyte a deposition modifying agent to form an interchangeable electrolyte which is compatible with the components of the electroplating and battery electrochemical cells, being non-reactive or slowly reactive with the electrolyte and capable of being attracted to the negative electrode, providing at least one effect selected from the group consisting of inhibiting or preventing dendritic deposition of metal ions emanating from the positive electrode on the negative electrode in a battery electrochemical cell and promoting smooth electroplating of an electroplating surface in an electroplating electrochemical cell removing the interchangeable electrolyte from the battery electrochemical cell, and blending the interchangeable electrolyte with a fresh electrolyte to form a recycled interchangeable electrolyte.

35. The method of claim 34 further comprising transferring the interchangeable electrolyte from the battery electrochemical cell to the electroplating electrochemical cell.

36. A method of providing an interchangeable electrolyte for use in electroplating and battery electrochemical cells comprising providing an electrolyte, adding to the electrolyte a deposition modifying agent to form an interchangeable electrolyte which is compatible with the components of the electroplating and battery electrochemical cells, being non-reactive or slowly reactive with the electrolyte and capable of being attracted to the negative electrode, providing at least one effect selected from the group consisting of inhibiting or preventing dendritic deposition of metal ions emanating from the positive electrode on the negative electrode in a battery electrochemical cell and promoting smooth electroplating of an electroplating surface in an electroplating electrochemical cell, recovering the interchangeable electrolyte and adjusting the specific gravity of the interchangeable electrolyte by dilution or concentration prior to reuse.

37. A method for providing an interchangeable electrolyte for use in electroplating cells and battery cells comprising:

providing an electrolyte;

treating the electrolyte with a deposition modifying agent to form an interchangeable electrolyte which is removable from a first electrochemical cell and insertable into a second electrochemical cell;

using the interchangeable electrolyte in a first electrochemical cell;

removing the interchangeable electrolyte from the first electrochemical cell; and adjusting a specific gravity of the interchangeable electrolyte for use in the second electrochemical cell.

38. The method of claim 37 further comprising inserting the interchangeable electrolyte into the second electrochemical cell.

39. The method for claim 37 further comprising removing the interchangeable electrolyte from the second electrochemical cell, adjusting the specific gravity of the interchangeable electrolyte by dilution or concentration, and adding the interchangeable electrolyte to a third electrochemical cell.

40. The method of claim 37 further comprising blending the interchangeable electrolyte with a fresh electrolyte to form a recycled interchangeable electrolyte.

41. The method of claim 37 further comprising adding water to the interchangeable electrolyte prior to reuse.

42. A method for determining whether an electrolyte obtained from an electrochemical cell is capable of reuse in another electrochemical cell comprising:

providing a sample of the electrolyte;

providing a test unit having two interconnected electrochemical cells, a first electrochemical cell and a second electrochemical cell, each cell having a positive electrode and a negative electrode and means for applying power to the electrodes;

placing the sample in the first electrochemical cell and placing a standardized electrolyte in the second electrochemical cell, the standardized electrolyte being functionally equivalent to a fresh electrolyte; and, applying power to the electrodes for a time sufficient to identify performance differences between the sample and the standardized electrolyte.

43. The method of claim 42 further comprising inspecting the negative electrodes for an amount and quantity of material deposited thereon.

44. The method of claim 42 wherein the sample electrolyte is from a battery cell, and the standardized electrolyte is a fresh battery electrolyte.

45. A method of claim 42 further comprising treating the sample prior to placing the sample in the first electrochemical cell.

46. The method of claim 42 further comprising concentrating or diluting the sample prior to placing the sample in the first electrochemical cell.

47. The method of claim 42 further comprising comparing the performance differences between the two electrochemical cells and determining whether the sampled electrolyte is usable in another electrochemical cell.

48. The method of claim 42 wherein the electrolyte sample is obtained from a secondary cell.

49. The method of claim 42 wherein the electrolyte sample is obtained from an electroplating cell.

* * * * *